United States Patent
Chiu et al.

(10) Patent No.: US 8,208,560 B2
(45) Date of Patent: Jun. 26, 2012

(54) BIT DEPTH ENHANCEMENT FOR SCALABLE VIDEO CODING

(75) Inventors: Yi-Jen Chiu, San Jose, CA (US); Hong Jiang, El Dorado Hills, CA (US); Yingta Yeh, Orangevale, CA (US)

(73) Assignee: Intel Corporation, Santa Clara, CA (US)

( * ) Notice: Subject to any disclaimer, the term of this patent is extended or adjusted under 35 U.S.C. 154(b) by 1286 days.

(21) Appl. No.: 11/974,686

(22) Filed: Oct. 15, 2007

(65) Prior Publication Data

US 2009/0097561 A1 Apr. 16, 2009

(51) Int. Cl.
*H04N 7/12* (2006.01)
(52) U.S. Cl. .................... 375/240.25; 382/238
(58) Field of Classification Search ............... None
See application file for complete search history.

(56) References Cited

U.S. PATENT DOCUMENTS

| | | | |
|---|---|---|---|
| 5,327,502 A | 7/1994 | Katata et al. | |
| 6,038,576 A | 3/2000 | Ulichney et al. | |
| 6,707,943 B2 | 3/2004 | Gicquel et al. | |
| 7,308,146 B2 | 12/2007 | Becker et al. | |
| 7,400,779 B2 | 7/2008 | Daly et al. | |
| 7,424,166 B2 * | 9/2008 | Daly | 382/263 |
| 7,471,847 B2 | 12/2008 | Yano | |
| 7,650,042 B2 | 1/2010 | Winger | |
| 7,747,100 B2 | 6/2010 | Kim et al. | |
| 7,787,704 B2 | 8/2010 | Daly et al. | |
| 2003/0016884 A1 * | 1/2003 | Altunbasak et al. | 382/299 |
| 2004/0184766 A1 | 9/2004 | Kim et al. | |
| 2004/0263538 A1 | 12/2004 | Ohta et al. | |
| 2005/0135694 A1 | 6/2005 | Daly | |
| 2005/0141779 A1 * | 6/2005 | Daly | 382/260 |
| 2005/0147317 A1 | 7/2005 | Daly et al. | |
| 2005/0152614 A1 | 7/2005 | Daly et al. | |
| 2005/0207492 A1 | 9/2005 | Pao | |
| 2006/0072044 A1 | 4/2006 | Kawamura et al. | |
| 2006/0233438 A1 | 10/2006 | Xu et al. | |
| 2006/0269159 A1 * | 11/2006 | Kim et al. | 382/256 |
| 2007/0081193 A1 * | 4/2007 | Lee et al. | 358/3.27 |
| 2007/0236610 A1 * | 10/2007 | Zhou et al. | 348/701 |

(Continued)

FOREIGN PATENT DOCUMENTS

JP 2005-051337 2/2005

(Continued)

OTHER PUBLICATIONS

U.S. Patent Application entitled, "Converting Video and Image Signal Bit Depths ," filed Oct. 15, 2007 concurrently herewith.

(Continued)

*Primary Examiner* — Michael J Moore, Jr.
(74) *Attorney, Agent, or Firm* — Trop, Pruner & Hu, P.C.

(57) ABSTRACT

A video system includes an analyzer and a bit depth predictor. The analyzer receives a first coded video signal, which is indicative of first values for pixels. The first values are associated with a first bit depth. The analyzer, for each pixel, analyzes the first values for the pixels located in a neighborhood that contains said each pixel. The bit depth predictor, based at least in part on the analysis, generates a second coded video signal that is indicative of second values for the pixels. The second values are associated with a second bit depth that is different than the first bit depth.

20 Claims, 6 Drawing Sheets

U.S. PATENT DOCUMENTS

| | | | |
|---|---|---|---|
| 2007/0248280 A1 | 10/2007 | Winger | |
| 2007/0269104 A1* | 11/2007 | Whitehead et al. | 382/162 |
| 2008/0263621 A1 | 10/2008 | Austerlitz et al. | |
| 2009/0003457 A1* | 1/2009 | Liu et al. | 375/240.25 |
| 2009/0087111 A1* | 4/2009 | Noda et al. | 382/238 |
| 2009/0097763 A1* | 4/2009 | Chiu | 382/238 |
| 2009/0262798 A1* | 10/2009 | Chiu et al. | 375/240.01 |
| 2010/0008418 A1* | 1/2010 | Wu et al. | 375/240.12 |

FOREIGN PATENT DOCUMENTS

JP      2007-266749      11/2007

OTHER PUBLICATIONS

U.S. Appl. No. 11/974,688, Office Action dated Dec. 9, 2010.
U.S. Appl. No. 11/974,688, Final Office Action dated May 26, 2011.
U.S. Appl. No. 11/974,688, Office Action dated Sep. 7, 2011.

* cited by examiner

BIT DEPTH ENHANCEMENT FOR SCALABLE VIDEO CODING

BACKGROUND

The invention generally relates to bit depth enhancement for scalable video coding.

A particular video may be watched by a number of different viewers using a variety of different devices and connections. For example, a particular Internet website may broadcast a video stream that may be viewed across various wired and wireless networks by mobile devices, desktop computers, televisions, etc., which may have different capabilities and connection to the website. For purposes of accommodating this heterogeneous environment, a concept called scalable video coding may be employed.

In scalable video coding, a multilayered compressed video stream is provided, which allows each end device to extract the information that matches the device's capability and ignore the remaining information. The compressed video stream may be encoded to accommodate a number of different scalable features, such as a scalable resolution, scalable frame rate, or scalable signal-to-noise ratio (SNR).

For purposes of generating the scalable video stream, the original video stream is processed by an encoder, which generates a compressed video stream that includes a baseline layer and at least one enhancement layer. As its name implies, the baseline layer constitutes the minimum information regarding the video. An end device may take advantages of features of the enhancement layer for purposes of scaling the received video stream to match the end device's capabilities.

The process of scalable video encoding typically involves converting the bit depth of the baseline layer to a higher bit depth for the enhancement layer. In this context, the "bit depth" means the number of bits that are used to represent each particular pixel value. For example, a compressed video stream that is associated with the baseline layer may have a bit depth of eight, in that each pixel value of the stream is represented by eight bits. The enhancement layer stream may have pixel values that are each represented by ten bits. Thus, the bit depth conversion involves converting eight bit pixel values of the baseline layer stream into the corresponding ten bit pixel values of the enhancement layer stream. Traditional bit depth scaling techniques involve block-based mapping or tone mapping. However, these techniques may be relatively inefficient from the standpoint of coding.

DETAILED DESCRIPTION

Figure 1:
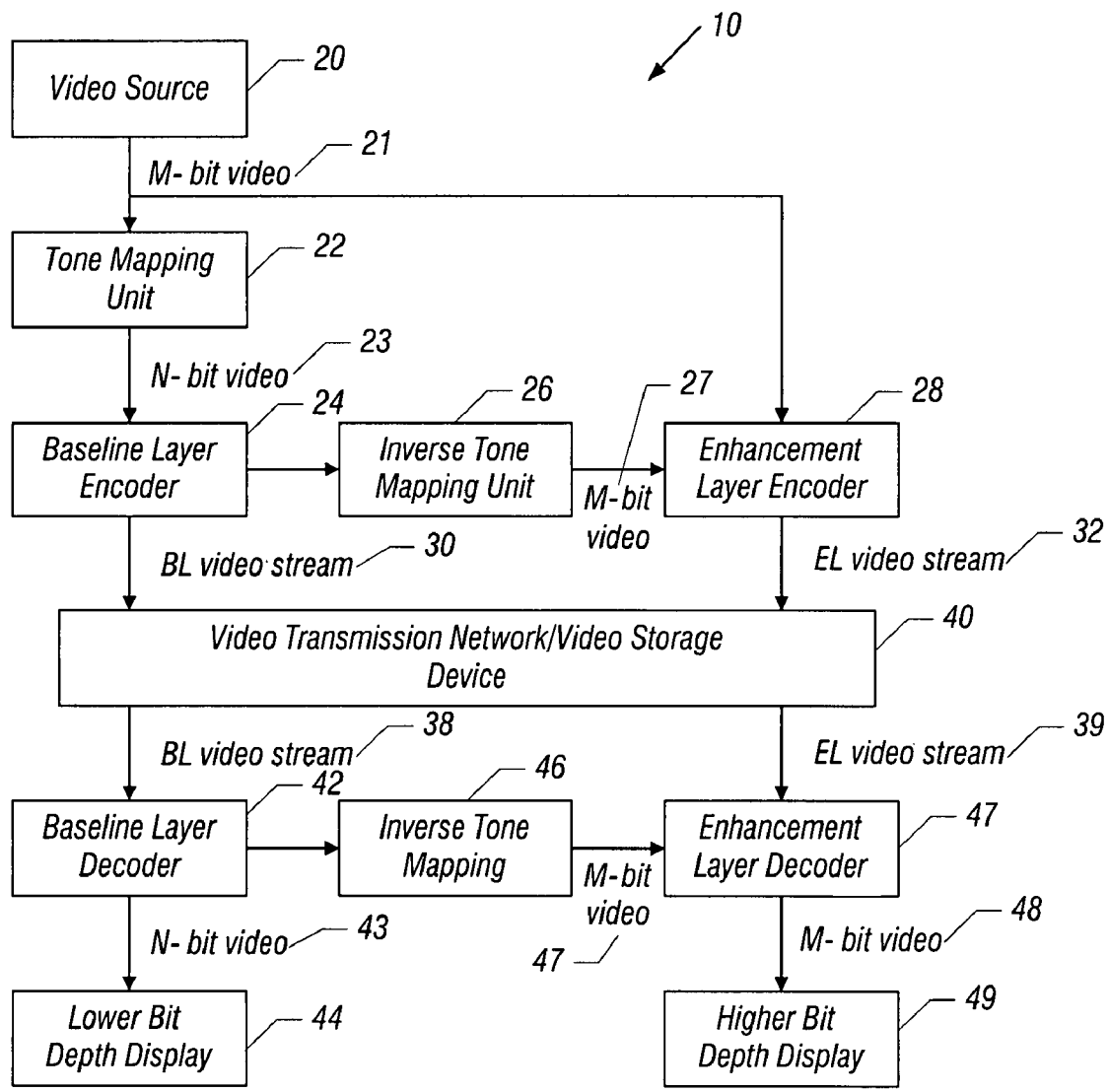
FIGS. 1 and 4 are block diagrams of scalable video codec (SVC) systems of the prior art.

Referring to FIG. 1, a conventional scalable video codec (SVC) system 10 includes a video source 20, which captures successive frames of image data to produce a video signal 21, whose pixel values have a bit depth of M (a bit depth of ten, as a non-limiting example). In other words, the video image that is captured by the video source 20 has pixels that are each defined by pixel values that have M bits (i.e., for each pixel, one M-bit pixel value per color space component).

The SVC system 10 processes the M-bit video signal 21 for purposes of producing encoded baseline layer and enhancement layer video streams. More specifically, for purposes of producing an encoded baseline video stream (herein called the "BL video stream 30"), the SVC system 10 includes a tone mapping unit 22 and a baseline layer encoder 24. From the M-bit video signal 21, the tone mapping unit 22 produces a lower bit depth signal (called an "N-bit video signal 23") that has bit depth of N (a bit depth of eight, as a non-limiting example), which is less than M. The baseline layer encoder 24 compresses the N-bit video signal 23 to generate the BL video stream 30.

For purposes of generating the encoded enhancement layer video stream (herein called the "EL video stream 32"), the SVC system 10 includes an inverse tone mapping unit 26 and an enhancement layer encoder 28. The inverse tone mapping unit 26 converts a compressed N-bit video stream that is provided by the baseline layer encoder 24 into a compressed M-bit video stream 27. The enhancement layer encoder 28 processes the compressed M-bit video stream 27 along with the M-bit video signal 21 for purposes of generating the EL video stream 32.

The BL 30 and EL 32 video streams may be communicated to a video transmission network (a wireless network, a cellular network, the Internet, a broadcast network, etc.) and/or to video storage device, as indicated at reference numeral 40. The storage device may be a disc, hard drive, CD-ROM, storage area network (SAN), web server, server farm, etc. Regardless of the particular transmission network or storage device BL 38 and EL 39 video streams may be eventually received/retrieved from the transmission network/storage device 40 by an end device and decoded (decompressed, for example) for purposes of producing an N-bit video signal 43 for a lower bit depth display 44 or an M-bit video signal 48 for a higher bit depth display 49.

More specifically, the BL video stream 38 may be decoded by a baseline layer decoder 42, which produces the N-bit video signal 43 for the lower bit depth display 44. The EL video stream 39 may be decoded by an enhancement layer decoder 47, which receives the EL video stream 39 along with an M-bit video stream 47 that is furnished by an inverse tone mapping unit 46. The inverse tone mapping unit 46 produces the M-bit video stream 47 in response to a N-bit decompressed video stream that is provided by the baseline layer decoder 42. The enhancement layer decoder 47, in turn, provides the M-bit video signal 48 to the higher bit-depth display 49.

Tone mapping is a technique that is often used to convert a higher bit depth video into a lower bit depth video. This technique includes linear scaling, piecewise interpolation and involves generating and using a look-up table. The principle behind tone mapping is to provide the pixel-to-pixel mapping from the high bit depth pixel values to the low bit depth pixel values. With the information of mapping being provided by the video encoder, the video decoder is able to construct the high bit depth video from the decoded low bit depth video.

It has been discovered, however, that tone mapping may be relatively inefficient in the context of coding in that tone mapping does not consider the pixel values in the local neighborhood of each pixel value being mapped. More specifically, bit depth conversion techniques are described herein that take into account the local pixel neighborhood in the lower N-bit depth signal for each pixel value that is converted.

Figure 6:
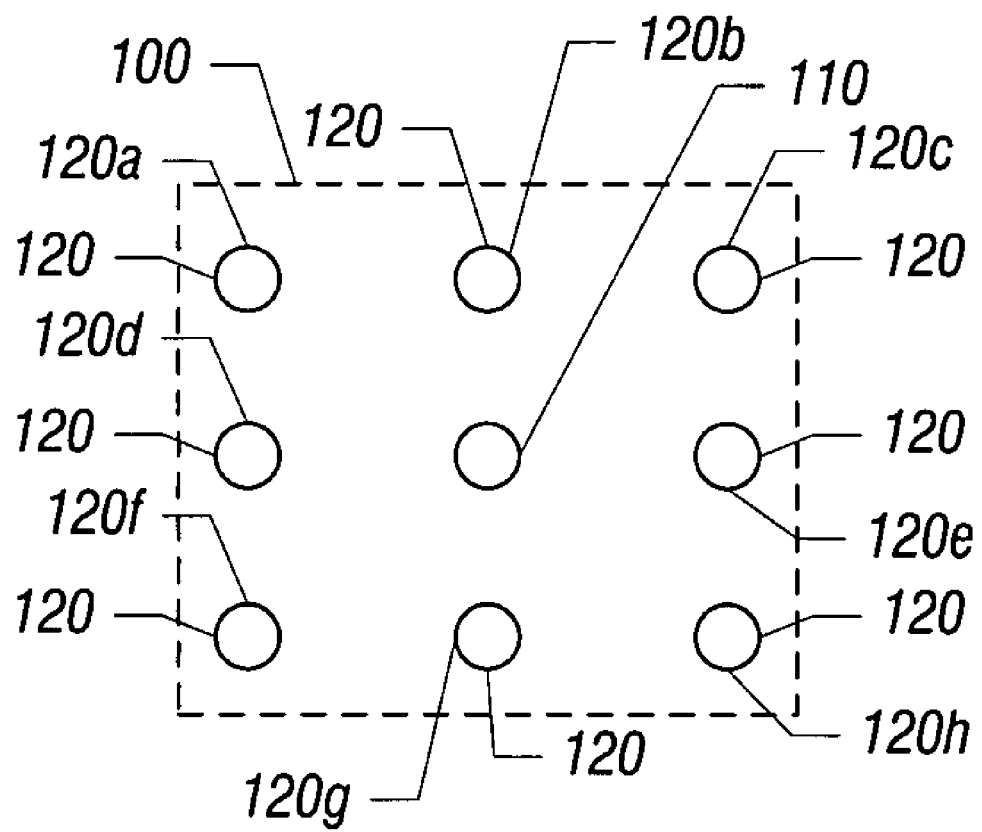
FIG. 6 is an illustration of a local pixel neighborhood according to an embodiment of the invention.

The pixel neighborhood may be formed from the pixels in the current picture, which are closest to the pixel whose pixel value is being converted to a higher bit depth. The pixel neighborhood may alternatively be the co-located neighborhood of the target pixel in a temporally previous picture or the co-located neighborhood of the target pixel in a temporally future picture. The boundaries of the pixel neighborhood may be user defined, in accordance with some embodiments of the invention. Referring to FIG. 6, as a non-limiting specific example, the pixel neighborhood may be a three-by-three neighborhood 100 that includes a target pixel 110 (the pixel whose value is being converted to a higher bit depth) at its center and eight adjacent pixels 120 (specific adjacent pixels 120a-h being described below). For this example, the target pixel 110 is the center of the three-by-three neighborhood 100, with four adjacent pixels 120a, 120c, 120f and 120h being located diagonally from the target pixel 110, two adjacent pixels being located to the left (pixel 120d) and right (pixel 120e) of the target pixel 110, and two adjacent pixels being located above (pixel 120b) and below (pixel 120g) the target pixel 110. As noted above, the neighborhood 100 may be the neighborhood of the target pixel in the present picture (i.e., the picture currently being represented by the N-bit depth signal), the co-located neighborhood of the target pixel in a temporally previous picture or the co-located neighborhood of the target pixel in a temporally future picture.

Figure 2:
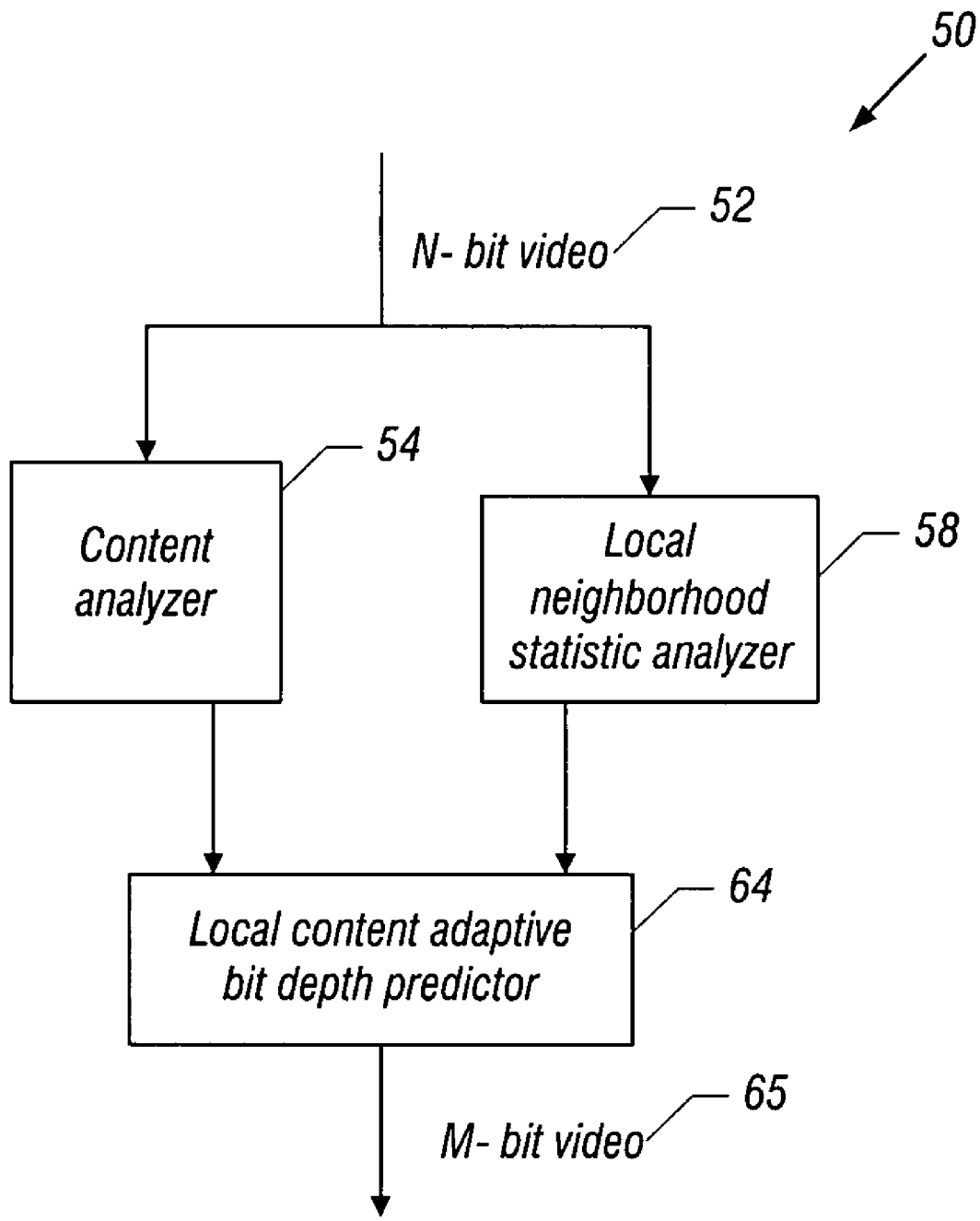
FIG. 2 is a block diagram of a content adaptive bit depth enhancer according to an embodiment of the invention.

For purposes of improving the coding efficiency of the bit depth scalability in a scalable video codec system, a content adaptive bit depth enhancer 50, which is depicted in FIG. 2 may be used in accordance with embodiments of the invention. As described below, the bit depth enhancer 50 steps through pixel values of the compressed N-bit signal stream and bases each bit depth conversion on the information gleaned about the neighborhood of each pixel. As discussed above, the neighborhoods may be associated with present, temporally previous and/or temporally future pictures.

Referring to FIG. 2, in general, the bit depth enhancer 50 receives a compressed N-bit video stream 52, which is analyzed by a content analyzer 54 and a local neighborhood statistic analyzer of the enhancer 50. For each local neighborhood, the content analyzer 54 detects for the presence of edges (i.e., horizontal, vertical and/or diagonal edges) in the neighborhood. As further described below, the bit depth enhancer 50 deems a particular neighborhood to be heterogeneous if the content analyzer 54 detects edges in the neighborhood; and for this scenario, the bit depth enhancer 50 may default to a bit depth conversion that is provided by another component of the system, as further described below.

Otherwise, if no edges are detected in the neighborhood, the bit depth enhancer 50 determines offset and scaling factor values for the bit depth conversion based on an analysis of the content of the neighborhood.

The local neighborhood statistic analyzer 58 determines various statistics of the neighborhood. Based on the results of the processing by the analyzers 54 and 58, a local content adaptive bit depth predictor 64 of the bit depth enhancer 50 converts the compressed N-bit video stream 52 into a compressed higher bit depth M-bit video stream 65.

In accordance with some embodiments of the invention, the content analyzer 54 may apply an edge detection metric for purposes of detecting the presence of vertical, horizontal or diagonal edges in the neighborhood. The detected presence of an edge in the neighborhood may be used as a basis to deem that the neighborhood is not sufficiently homogenous for bit depth prediction that is based on the local neighborhood pixel values, as further described below. To the contrary, the non-detection of an edge in the neighborhood may be used to deem that the neighborhood is sufficiently homogenous for bit depth prediction that is based on the local neighborhood pixel values.

As a more specific example, for the case where a three-by-three neighborhood is used, the content analyzer 54 may apply a Sobel edge operator to the three-by-three neighborhood. The Sobel edge operator may be described as follows in Eqs. 1, 2, 3 and 4 below:

$$E\_h = \begin{bmatrix} -1 & -2 & -1 \\ 0 & 0 & 0 \\ 1 & 2 & 1 \end{bmatrix},$$ Eq. 1

$$E\_v = \begin{bmatrix} -1 & 0 & 1 \\ -2 & 0 & 2 \\ -1 & 0 & 1 \end{bmatrix},$$ Eq. 2

$$E\_P45 = \begin{bmatrix} -2 & -1 & 0 \\ -1 & 0 & 1 \\ 0 & 1 & 2 \end{bmatrix}, \text{ and}$$ Eq. 3

$$E\_N45 = \begin{bmatrix} 0 & -1 & -2 \\ 1 & 0 & -1 \\ 2 & 1 & 0 \end{bmatrix}.$$ Eq. 4

Eq. 1 is the component of the edge operator directed to detecting a horizontal edge; Eq. 2 is the component of the edge operator directed to detecting a vertical edge; Eq. 3 is the component of the edge operator directed to detecting a positive forty-five degree edge; and Eq. 4 is the component of the edge operator directed to detecting a negative forty-five degree edge.

Given the above-defined edge operator, an edge metric, called "EM(x)," may be formulated as the convolution of the weighting in Eqs. 1, 2, 3 and 4 in a three-by-three neighborhood (called "NH9(x)" below), as follows:

$$EM(x)=|NH9(x)*E\_h|+|NH9(x)*E\_v|+|NH9(x)*E\_P45|+|NH9(x)*E\_N45|.$$ Eq. 5

In Eq. 5, the target pixel value in the N-bit signal is denoted by "x."

In accordance with some embodiments of the invention, the content analyzer 54 determines the edge metric EM(x), and the local content adaptive bit depth predictor 64 compares the edge metric EM(x) to a predefined threshold for purposes of determining whether an edge has been detected in the neighborhood. Thus, if the edge metric EM(x) is above the predefined threshold, the bit depth predictor 64 assumes that an edge has been detected. Otherwise, the bit depth predictor 64 assumes that no edge has been detected.

It is noted that other edge operators, other than the Sobel edge operator, may be used in accordance with other embodiments of the invention. Additionally, the use of the horizontal (Eq. 1) and vertical (Eq. 2) edge operator components may be sufficient for edge detection, without the use of the diagonal (Eqs. 3 and 4) edge components, in accordance with other embodiments of the invention. Thus, many variations are contemplated and are within the scope of the appended claims.

The neighborhood contains k pixels, and the value of k depends on the neighborhood that is used. For example, for the three-by-three neighborhood 100 example of FIG. 6, k is equal to nine. As another example, the number of k neighboring pixels may be twenty-five for a five-by-five neighborhood. As yet another example, the number of k neighboring pixels may be five, for the case in which a neighborhood of two pixels above and below the target pixel as well as two pixels to the left and right of the target pixel are considered. Thus, many variations are contemplated and are within the scope of the appended claims.

In accordance with embodiments of the invention, the local neighborhood statistic analyzer 58 gathers the following neighborhood statistics: a summation of k neighboring pixels, called "sum_k," and the variance of k neighboring pixels, called "var_k." A parameter defined as the distance, or "dist_x," which the bit depth predictor 64 uses (as further discussed below) may be described as follows:

$$\text{dist\_}x = (k*x - \text{sum\_}k)/(\text{var\_}k + C) \qquad \text{Eq. 6}$$

where "C" represents a pre-defined constant value.

In general, the bit depth predictor 64 converts a particular N-bit target pixel value x from the N-bit signal into an M-bit target pixel value (called "y") in accordance with the following relationship:

$$y = a * x \theta b, \qquad \text{Eq. 7}$$

where "a" represents a scaling factor value, "b" represents an offset value, and "θ" represents a sign operator. The a scaling factor value and b offset value are functions of the pixel values in the corresponding neighborhood, as described below. In general, the a scaling factor value follows a non-linear function, in that the bit depth predictor 64 sets the a scaling factor value equal to M less N (as a non-limiting example) if no edge is detected (i.e., the edge metric EM(x) is less than a pre-defined threshold) and modifies the a scaling factor value if an edge is detected.

More specifically, as an example, M may be equal to ten (corresponding to ten bits per pixel value), and N may be equal to eight (corresponding to eight bits per pixel value). Therefore, M has a range of 1024 ($2^{10}$), which is four times greater than the range of N, which is 256 ($2^{8}$). When an edge is detected, the bit depth predictor 64 may ignore the local pixel neighborhood (due to the heterogeneous nature of the neighborhood) and set the a scaling factor value to four (due to the relative scale of the ranges) and set the b offset value to zero. However, when no edge is detected, the bit depth predictor 64 adjusts the bit depth conversion based on the local neighborhood by setting the a scaling factor to M-N (or another default value) and setting the b offset value to a value determined by the local neighborhood pixel content, as further described below. In other embodiments of the invention, when an edge is detected, the bit depth predictor 64 allows another bit depth technique (such as a tone mapping or a block-based bit depth scaling technique, as examples) to determine the converted pixel value, as further described below.

In accordance with some embodiments of the invention, when no edge is detected (i.e., when the edge metric EM(x) is below a predetermined threshold) the bit depth predictor 54 sets the offset value b as described below:

$$b = d * \text{dist\_}x, \qquad \text{Eq. 8}$$

where "dist_x" is defined in Eq. 6 and "d" represents a pre-defined constant value. In accordance with some embodiments of the invention, if the edge metric EM(x) is above the predefined threshold, then a heterogeneous pixel environment is assumed, and as such, the offset value b may be set to.

The sign operator θ may be a plus or minus operator, which may be based on a signal provided by the video encoder. Alternatively, the sign operator may be derived at the decoder side or may be specified according to a user definition. Thus, many variations are contemplated and are within the scope of the appended claims.

Figure 3:
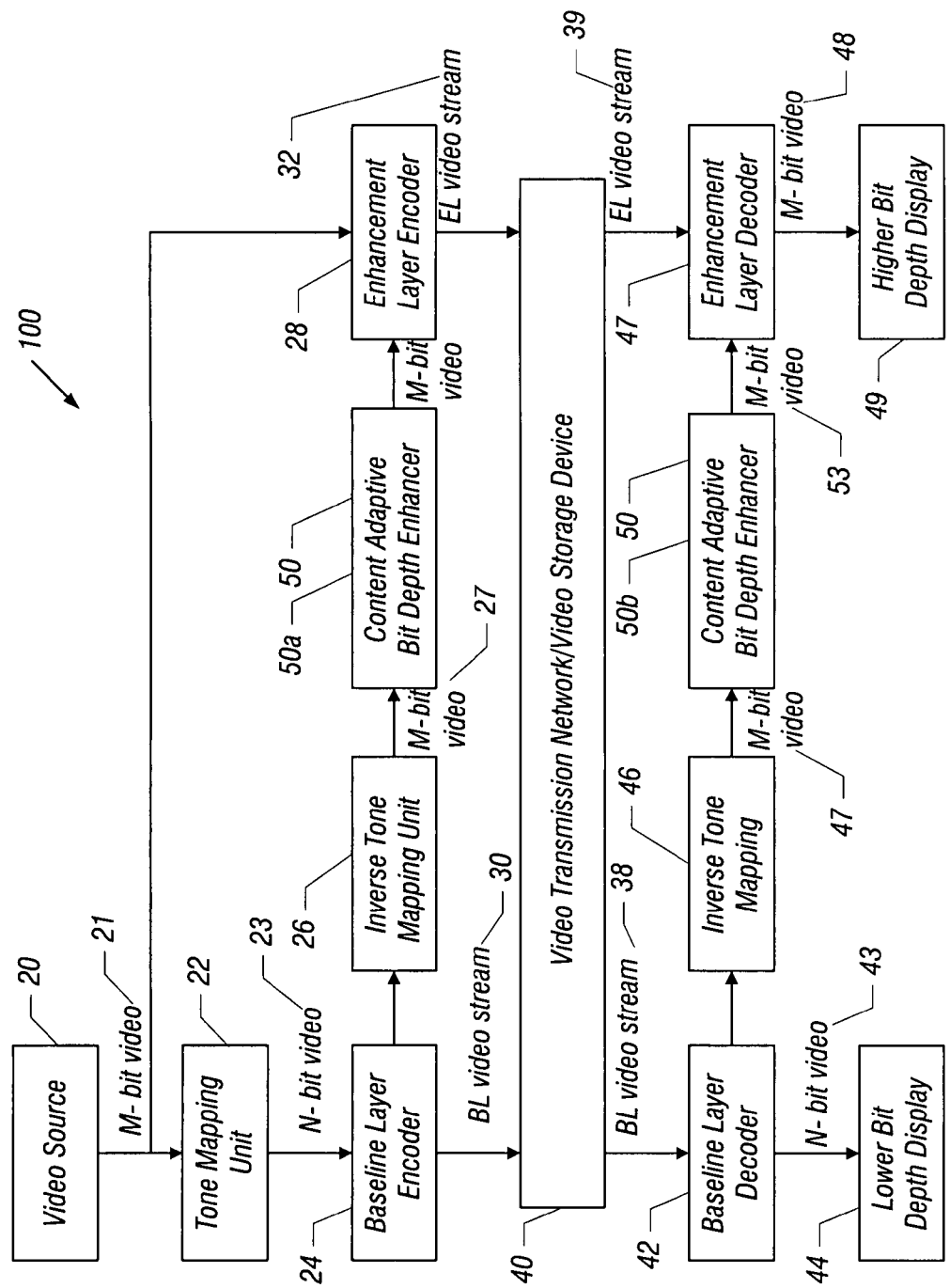
FIGS. 3 and 5 are block diagrams of scalable video codec (SVC) systems according to different embodiments of the invention.

Referring to FIG. 3, in accordance with embodiments of the invention, the content adaptive bit depth enhancer 50 may be incorporated both into the encoder and decoder sides of a scalable video codec (SVC) system 100. In this regard, the SVC system 100 is similar to the SVC system 10 (see FIG. 1), with similar reference numerals being used to denote similar components. However, unlike SVC system 10, the SVC system 100 includes the bit depth enhancer 50a (having the same design as the bit depth enhancer 50 of FIG. 2) between the inverse tone mapping unit 26 and the enhancement layer encoder 28. In this regard, the bit depth enhancer 50a, in accordance with some embodiments of the invention, receives the M-bit video stream 27 from the inverse tone mapping unit 26. The bit depth enhancer 50a also receives the N-bit video stream that is provided by the baseline layer encoder 24.

The bit depth enhancer 50a uses the bit depth conversion result from the inverse tone mapping unit 26 when an edge is detected in the pixel neighborhood. Otherwise, the bit depths enhancer 50c processes the N-bit signal that is provided by the baseline layer encoder 24 and performs the bit depth conversion for the pixel. Thus, the bit depth enhancer 50a supplements the operation of the inverse tone mapping unit 26.

On the decoding side, the system 100 includes a content adaptive depth enhancer 50b (having the same design as the bit depth enhancer 50 of FIG. 2), which, similar to the encoder side, is coupled between the inverse tone mapping unit 46 and the enhancement layer decoder 47 to supplement the bit depth conversion that is provided by the unit 46.

Figure 4:
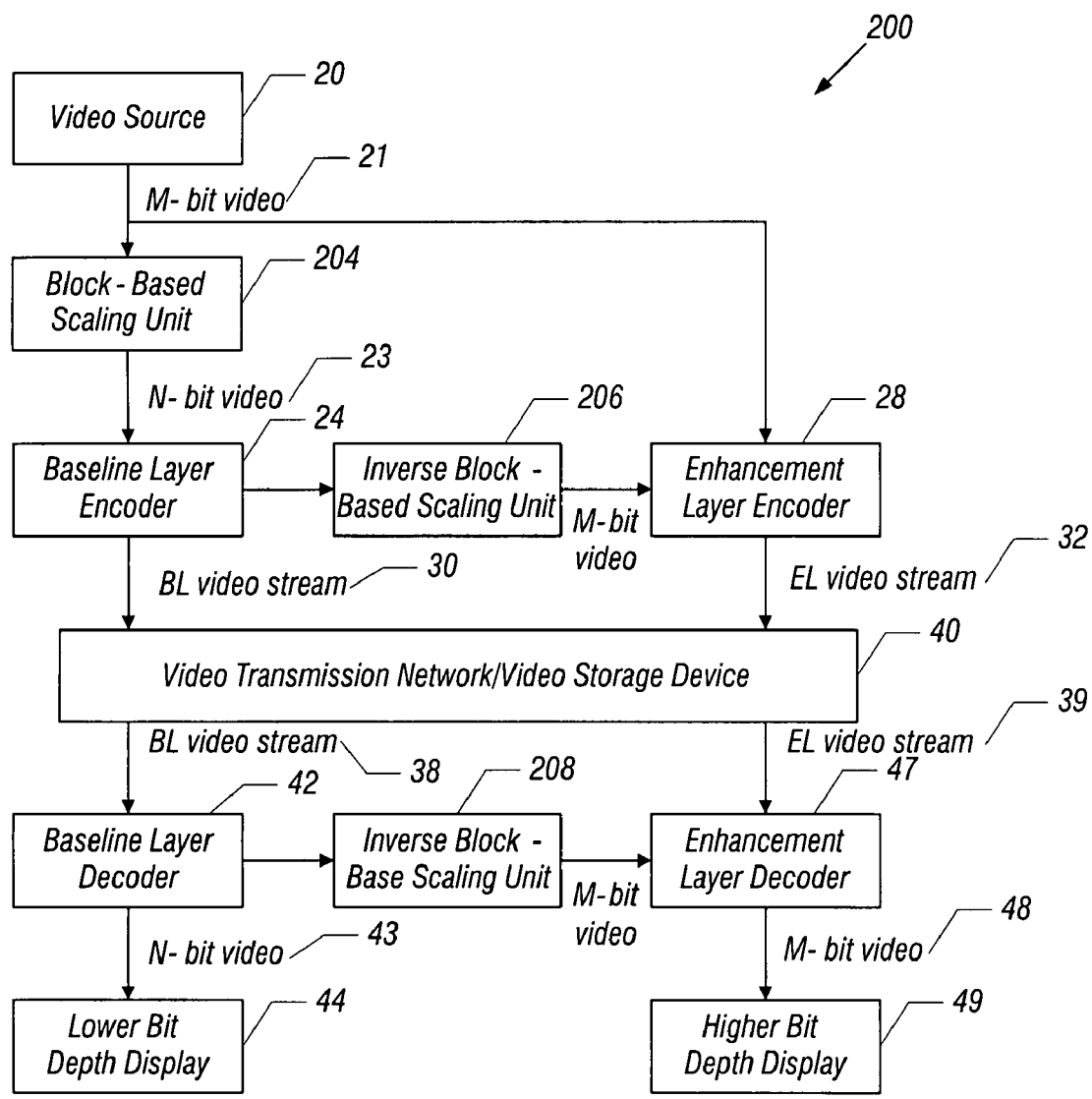

Referring to FIG. 4, as an alternative to the conventional SVC system 10 that is depicted in FIG. 1, another conventional SVC system 200 may be used. The SVC system 200 has a similar design to the SVC system 10, except that the inverse tone mapping units 26 and 46 are replaced by inverse block-based scaling units 206 and 208, respectively. Compared to the pixel-to-pixel mapping used in tone mapping, the block-based bit depth scaling approach divides the picture into blocks of pixel, and adopts identical scaling and offset values for pixels inside the block. That is, the video encoders determine a set of scaling factor and offset values for each block, and the video decoders utilize the determined set of scaling factor and offset values with the decoded pixel of the low bit depth in the BL video to reconstruct the pixel of the high bit depth in the EL video. The block size may be aligned with the macro block size, a 16×16 pixel block size, or a sub-micro block size, such as an eight-by-eight, 16×8, 8×16, 8×4, 4×8 or 4×4, which are compatible with the current scalable video codec (SVC) standard.

Figure 5:
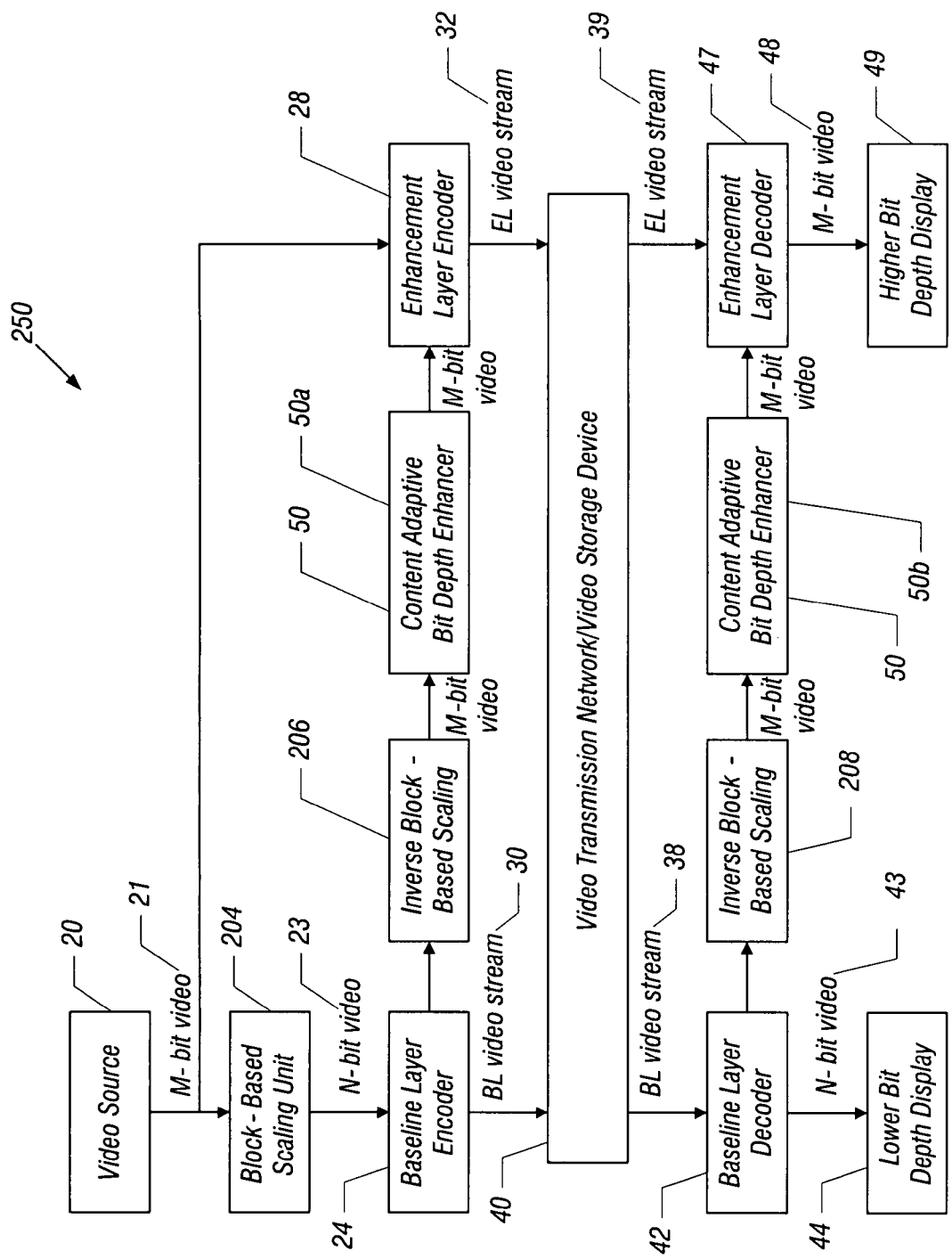

Referring to FIG. 5, for purposes of improving the coding efficiency, an SVC system 250 may be used in accordance with embodiments of the invention. The SVC system 250 has a similar design to the system 200, with similar reference numerals being used to denote similar components, except that the SVC system 250 includes content adaptive bit depth enhancers 50a and 50b, each of which shares the design of the content adaptive bit enhancer 50 (see FIG. 2). In this regard, as depicted in FIG. 5, the bit depth enhancer 50a is located between the inverse block-based scaling unit 206 and the enhancement layer encoder 28. The bit depth enhancer 50a uses the information of neighborhood analysis to supplement the prediction of high bit depth pixels with finer details so that better coding efficiency is achieved. As also depicted in FIG. 5, the bit depth enhancer 50b may be located between the inverse block scaling unit 208 and the enhancement layer decoder 47. When edges are detected, the bit depth conversion results provided by the block-based units 206 and 208 are used. Otherwise, the bit depth enhancers 50a and 50b provide the bit depth conversion based on the content of the pixel neighborhoods.

It is noted that in accordance with other embodiments of the invention, the content adaptive bit depth enhancers 50 may be used without the inverse tone mapping units 26 and 46 (of the system 100) or inverse block-based scaling units 206 and 208 (of the system 250). Thus, many variations are contemplated and are within the scope of the appended claims.

Depending on the particular embodiment of the invention, the advantages of the bit depth decoding techniques that are described herein may include one or more of the following. The content adaptive bit depth enhancer achieves efficient coding efficiency for bit depth scalability video by utilizing the characteristic of local content of target pixel in low bit depth. The content adaptive bit depth enhancer achieves efficient coding efficiency for the combined BL video and EL videos by utilizing the characteristic of local content of target pixel in low bit depth. The content adaptive bit depth enhancer predicts the signal of the higher bit depth from the signal of the lower bit depth through the feature derived from the signal of lower bit depth, and the content adaptive bit enhancer inherits the nice property of self-construction due to no additional overhead is needed to convey in the bitstream. The content adaptive bit depth enhancer predicts the signal of the higher bit depth in EL video from the signal of the lower bit depth in BL video through the feature derived from the signal of lower bit depth in BL video. The content adaptive bit depth enhancer predicts the signal of the higher bit depth in EL video from the signal of the lower bit depth in BL video through the neighborhood statistic and property of local content. The content adaptive bit depth enhancer improves the coding efficiency of the pixel-to-pixel tone mapping to convert high/low bit depth video by utilizing the local edge detection of low bit depth signal to adapt the construction of high bit depth signal. The content adaptive bit depth enhancer improves the coding efficiency of the block-based scaling to convert high/low bit depth video by utilizing the local edge detection of low bit depth signal to adapt the construction of high bit depth signal.

While the present invention has been described with respect to a limited number of embodiments, those skilled in the art, having the benefit of this disclosure, will appreciate numerous modifications and variations therefrom. It is intended that the appended claims cover all such modifications and variations that falls within the true spirit and scope of this present invention.

What is claimed is:

1. A method comprising:
   receiving a first coded video signal, the first coded video signal being indicative of first values for pixels, the first values being associated with a first bit depth;
   for each pixel, determining an associated degree of heterogeneity of the first values for the pixels located in a neighborhood that contains said each pixel; and
   selectively scaling the first values based on the associated determined degrees of heterogeneity to generate a second coded video signal indicative of second values for the pixels, the second values being associated with a second bit depth different than the first bit depth.

2. The method of claim i, further comprising:
   generating the first coded video signal, comprising using a baseline encoder or a baseline decoder.

3. The method of claim 1, further comprising:
   further basing the generation of the second coded video signal on results obtained by inverse block based scaling of the first coded video signal.

4. The method of claim 1, further comprising:
   further basing the generation of the second coded video signal on results obtained by inverse tone mapping of the first coded video signal.

5. The method of claim 1, wherein the neighborhoods comprise co-located neighborhoods associated with a temporally previous picture, co-located neighborhoods associated with a temporally future picture and/or neighborhoods associated with a current picture.

6. The method of claim 1, further comprising:
   wherein the analyzing comprises processing the first values for the pixels located in the neighborhood to detect an edge.

7. The method of claim 6, wherein the generating the second coded video signal comprises adjusting at least one of a scaling factor and an offset based on whether an edge is detected.

8. The method of claim 1, wherein the analyzing comprise processing the first values for the pixels located in the neighborhood to determine a statistic about the processed first values.

9. The method of claim 8, wherein the processing comprises determining at least one of a variance and a sum of the processed first values.

10. An article comprising a computer accessible non-transitory storage medium to store instructions that when executed cause a processor-based system to:
    receive a first coded video signal, the first coded video signal being indicative of first values for pixels, the first values being associated with a first bit depth;
    for each pixel, determine a degree of heterogeneity of the first values for the pixels located in a neighborhood that contains said each pixel; and
    selectively scaling the first values based on the associated determined degrees of heterogeneity to generate a second coded video signal indicative of second values for the pixels, the second values being associated with a second bit depth higher than the first bit depth.

11. The article of claim 10, the storage medium to store instructions that when executed cause the processor-based system to:
    further base the generation of the second coded video signal on results obtained by inverse block based scaling of the first coded video signal.

12. The article of claim 10, the storage medium to store instructions that when executed cause the processor-based system to:
    further base the generation of the second coded video signal on results obtained by inverse tone mapping of the first coded video signal.

13. The article of claim 10, the storage medium to store instructions that when executed cause the processor-based system to:
    process the first values for the pixels located in the local neighborhood to determine a statistic about the processed first values, and
    base the analysis at least in part on the determined statistic.

14. The article of claim 10, wherein the neighborhoods comprise co-located neighborhood associated with a temporally previous picture, co-located neighborhoods associated with a temporally future picture and/or neighborhoods associated with a current picture.

15. A video system, comprising:
    an analyzer to:
        receive a first coded video signal, the first coded video signal being indicative of first values for pixels, the first values being associated with a first bit depth; and for each pixel, determine an associated degree of heterogeneity of the first values for the pixels located in a neighborhood that contains said each pixel; and a bit depth predictor to selectively scale the first values based on the associated determined degrees of heterogeneity to generate a second coded video signal indicative of second values for the pixels, the second values being associated with a second bit depth different than the first bit depth.

16. The video system of claim 15, further comprising:
a baseline layer coder to provide the first coded video signal.

17. The video system of claim 16, further comprising:
an enhancement layer coder to receive the second coded video signal.

18. The video system of claim 15, further comprising:
an inverse tone mapping unit to at least partially generate the second coded video signal.

19. The video system of claim 15, further comprising:
an inverse block-based scaling unit to at least partially generate the second coded video signal.

20. The video system of claim 15, wherein the analyzer comprises:
a content analyzer to process the first values for the pixels located in the local neighborhood to detect for the presence of an edge in the local neighborhood; and a statistic analyzer to determine at least one statistic about the processed first values.

\* \* \* \* \*